Figure 1:
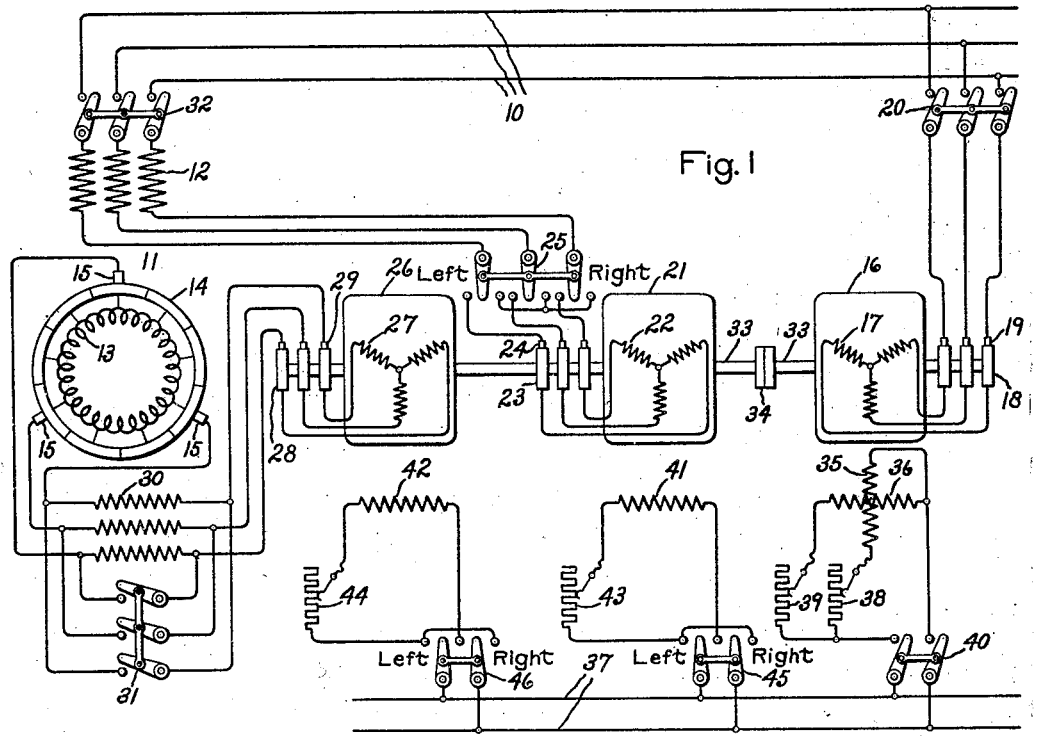

Aug. 15, 1933.  J. I. HULL  1,922,810
ADJUSTABLE SPEED ALTERNATING CURRENT COMMUTATOR MOTOR
Filed March 20, 1930  3 Sheets-Sheet 1

Inventor:
John I. Hull,
by Charles E. Tullar
His Attorney.

Aug. 15, 1933.  J. I. HULL  1,922,810
ADJUSTABLE SPEED ALTERNATING CURRENT COMMUTATOR MOTOR
Filed March 20, 1930  3 Sheets-Sheet 2

Inventor:
John I. Hull,
by Charles V. Tullar
His Attorney.

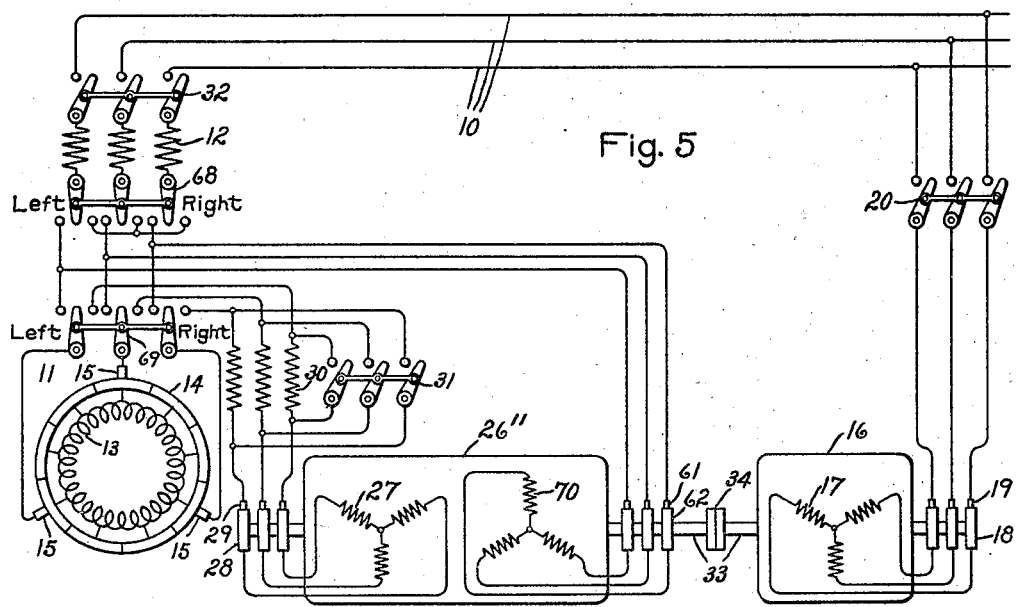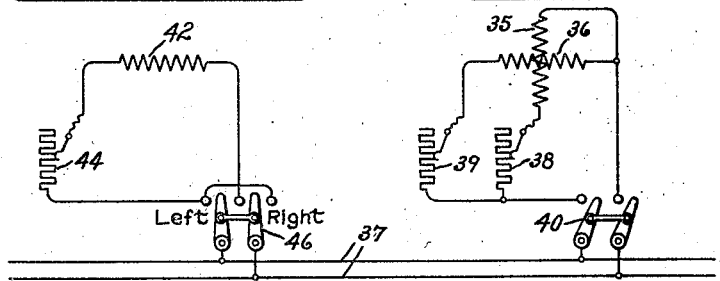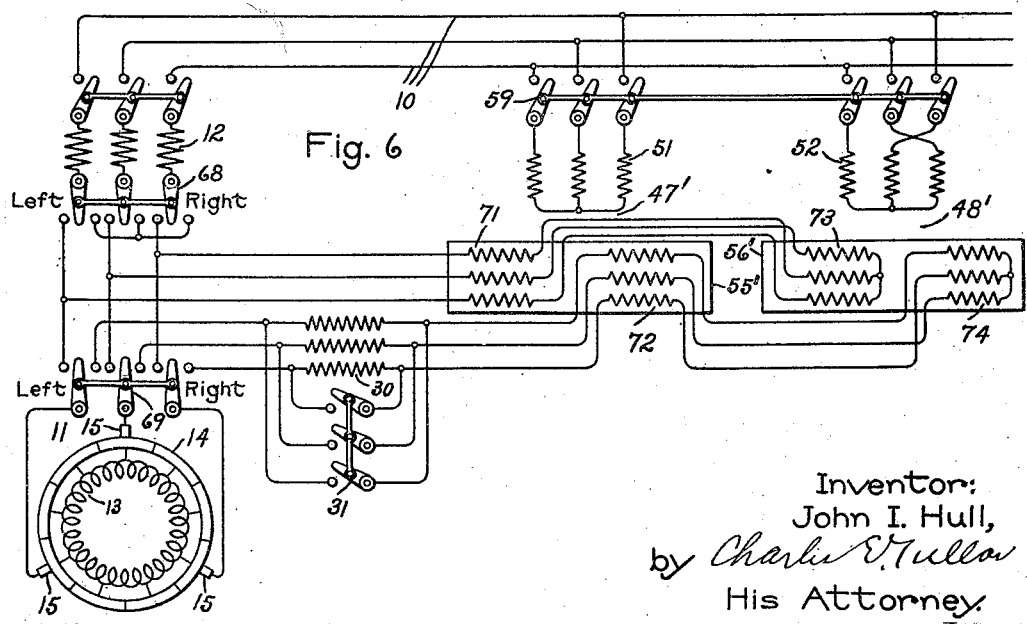

Patented Aug. 15, 1933

1,922,810

UNITED STATES PATENT OFFICE 1,922,810

ADJUSTABLE SPEED ALTERNATING CURRENT COMMUTATOR MOTOR

John I. Hull, Schenectady, N. Y., assignor to General Electric Company, a Corporation of New York Application March 20, 1930. Serial No. 437,497

14 Claims. (Cl. 172—274)

My invention relates to adjustable speed alternating current commutator motors and its principal object is to provide a novel method of operating said motors and a regulating set which is capable of varying the motor speed above and below synchronism and at the same time altering the characteristics of the motor so as to render it suitable for driving various types of loads in accordance with my novel method of operation.

Adjustable speed alternating current commutator motors are used for driving various types of loads and the variation in power required with changes in speed will depend on the characteristic of the load. For example, the power required to drive centrifugal pumps and fans varies approximately as the cube of the speed, thus requiring a decrease in torque with a decrease in speed and an increase in torque with an increase in speed, this type of load being known in the art as a fan load. The power required to drive reciprocating pumps operating against a constant head varies directly as the speed since the torque must remain constant at all speeds; hence such loads are termed constant torque loads. On the other hand, certain types of mill loads require constant horse-power at all speeds and hence are termed constant horse-power loads. To avoid needless repetition the terms fan loads, constant torque loads and constant horse-power loads will be used throughout this application to designate the approximate types of loads described.

The brush shifting alternating current commutator motor has its speed adjusted by shifting the brushes and hence interpole windings can not be used to improve commutation and, therefore, these motors are limited to comparatively low horse-power output per pole by the amount of induced voltage between adjacent commutator segments which the brushes can withstand without excessive sparking. Interpole windings can be used with non-brush-shifting alternating current commutator motors and hence they can be built with higher horse-power outputs per pole than equivalent brush shifting types. It is therefore preferable from the standpoint of commutation to build the non-brush-shifting motor and my invention will be described in connection with such a motor. I wish it understood however that my invention also applies to the brush shifting type of motor and this will become evident as this specification progresses. It is therefore desirable to provide a simple and inexpensive arrangement by means of which the speed of a non-brush-shifting motor can be smoothly varied over the desired range and at the same time to cause the motor to have characteristics to suit the load it drives. In accordance with my invention the torque characteristics of the motor are regulated by varying the effective voltage applied to the primary windings, thereby regulating the strength of the working magnetic flux of the motor, and the speed of the motor is varied by impressing suitable voltages on the rotor windings.

My invention will be best understood from the following description when considered in connection with the accompanying drawings while the features of my invention which are believed to be novel and patentable are pointed out in the appended claims.

Figure 2:
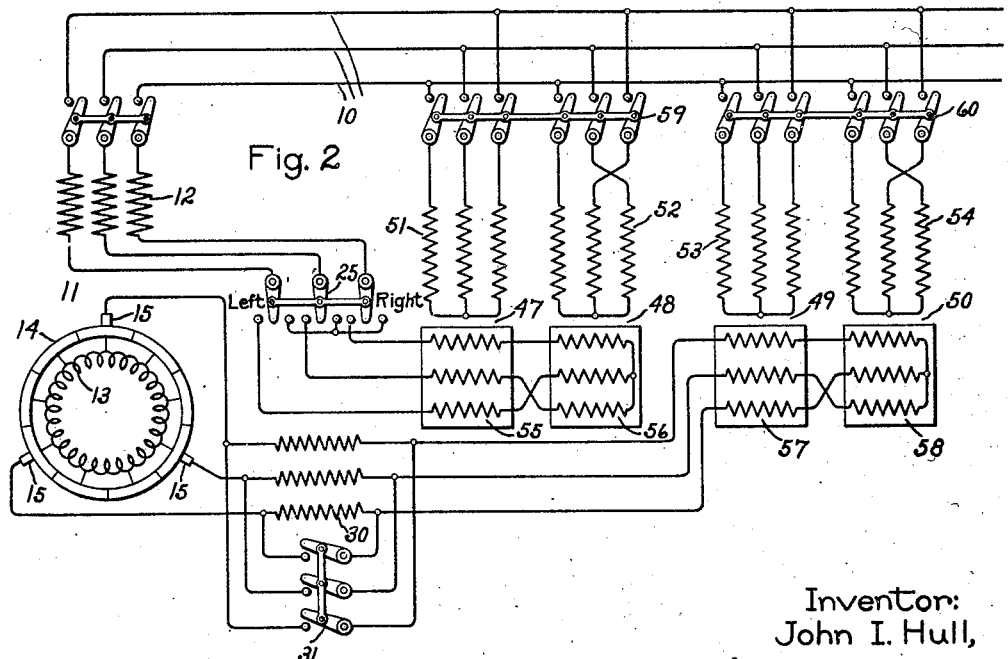
Figure 3:
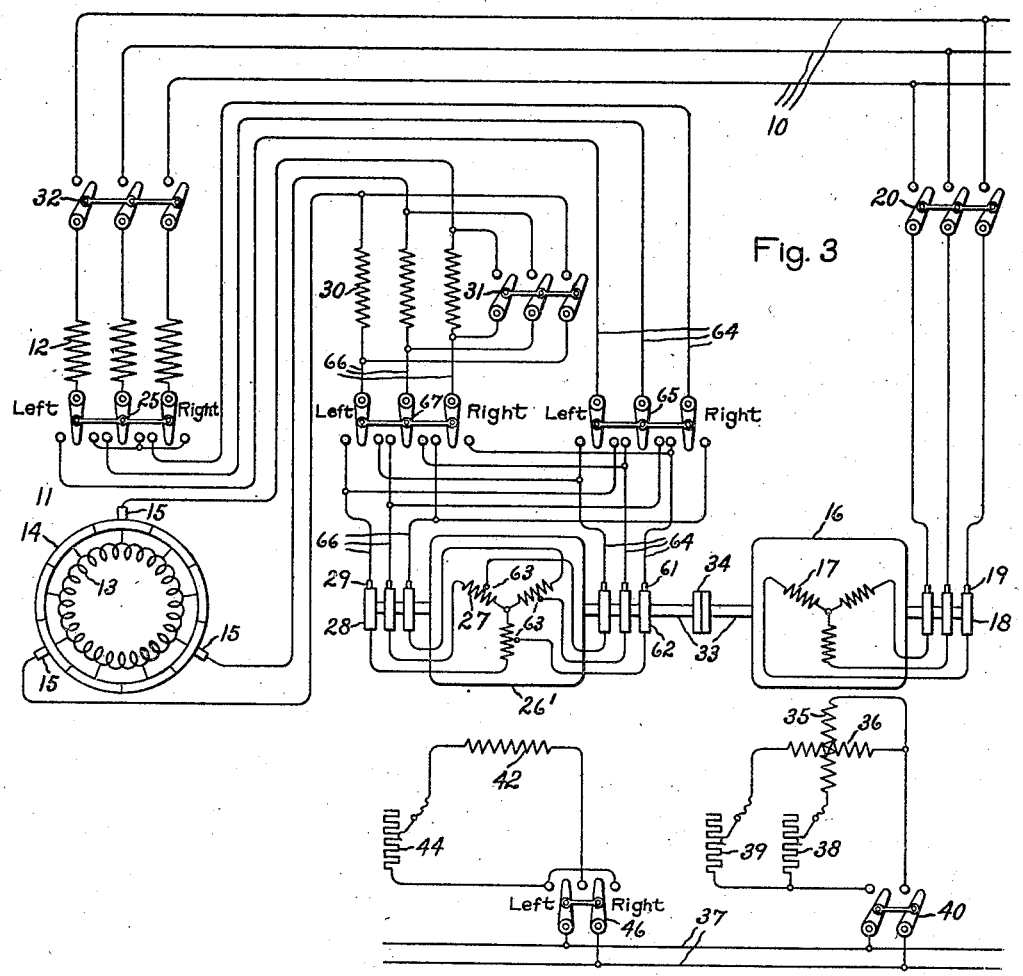
Figure 4:
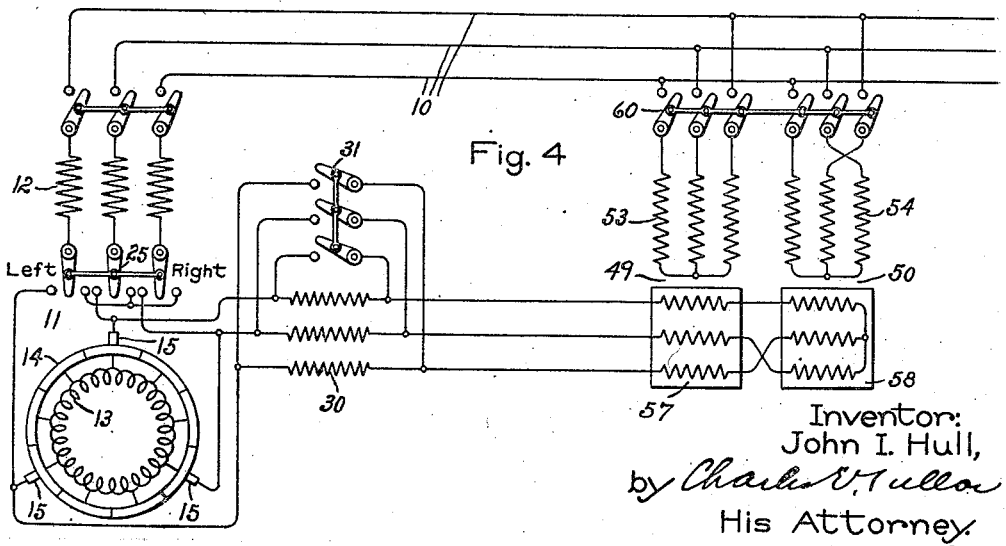

Fig. 1 represents one embodiment of my invention wherein the speed and the torque characteristics of the alternating current commutator motor are varied by regulating apparatus consisting of a synchronous motor driving two sychronous generators; Fig. 2 represents an embodiment of my invention wherein the regulating apparatus consists of two sets of induction regulators; Fig. 3 represents a preferred embodiment of my invention wherein the regulating apparatus consists of a two unit synchronous motor generator set; Fig. 4 represents an embodiment of my invention wherein the regulating apparatus consists of one set of induction regulators; Fig. 5 represents a modification of Fig. 3 employing two windings in the synchronous generator, and Fig. 6 represents a modification of Fig. 4 employing two secondary windings in each unit of the induction regulator set.

The following theoretical discussion will be of assistance in understanding the operation of my invention. It is well known to those skilled in the art that an ordinary induction motor runs at its so-called inherent speed below synchronism in order to generate a slip voltage in its rotor which causes a current flow therein, thus producing the necessary driving torque. If a voltage having rotor frequency is impressed on the rotor in opposition to the rotor voltage the speed decreases further below synchronism to enable the rotor to cut the magnetic flux at a faster rate so that the increased rotor voltage can balance the opposing voltage and supply the voltage drop in the rotor winding so as to maintain the necessary driving torque. If the impressed voltage is reversed thereby assisting the rotor voltage the speed will increase above its inherent value since the rotor need not generate all the voltage necessary to create the driving torque, and if this impressed voltage is of sufficient value the speed will rise above synchronism.

In Fig. 1, 10 represents a three phase alternating current supply system, 11 represents the alternating current commutator motor to be regulated and which consists of the primary winding 12 which is preferably stationary and the secondary winding 13 which is preferably rotatable and is connected to the commutator 14 on which rest the brushes 15. A synchronous motor 16 has a rotating armature 17 which may be connected to the alternating current supply system 10 through collector rings 18, brushes 19 and the switch 20. A synchronous generator 21 has a revolving armature 22 which may be connected in series with the primary winding 12 through collector rings 23, brushes 24 and switch 25. A synchronous generator 26 has a revolving armature 27 which may be connected to the brushes 15 through collector rings 28, brushes 29 and resistance 30 or switch 31. The switch 32 is provided to connect the primary winding 12 to the supply system 10. The revolving armatures 17, 22 and 27 are connected by the shafts 33 and coupling 34. The synchronous motor 16 has two separately excited stationary fields 35 and 36 which are arranged in quadrature relation to each other and which may be connected to the direct current supply system 37 through resistances 38, 39 and connecting switch 40. The synchronous generators 21 and 26 have separately excited stationary fields 41 and 42 respectively, and they may be connected to the direct current supply system 37 through resistances 43 and 44 and reversing switches 45 and 46. The machines 16, 21 and 26 have the same number of poles and since the armatures 17, 22 and 27 revolve at the same speed, the generators 21 and 26 will deliver alternating current having the same frequency as the lines 10. It follows that armature 22 may be connected in series with the primary winding 12 as their currents have the same frequency. The frequency of the currents in the secondary winding 13 varies with the slip but this frequency is changed by the commutator 14 so that the frequency at the brushes 15 is the same as that of the supply system 10 and hence the armature 27 may be connected to the brushes 15. For convenience of illustration I have represented 13 as a ring winding with a smaller diameter than its commutator 14 but in practice 13 will usually be a drum winding with a larger diameter than its commutator 14.

A brief description of the operation now follows: I will first assume it is desired to regulate the speed of the motor 11 when driving a constant torque load. The auxiliary set is put into serviceable condition by closing switches 20 and 40 and suitably adjusting resistances 38 and 39. The switch 25 is preferably closed to the right, thus short circuiting the free ends of winding 12 and forming a star connection therefor. The switch 32 is closed and the motor starts and runs as an induction motor with a wound rotor, the only difference being that the frequency of the currents in the rotor winding 13 is changed to line frequency at the brushes 15. The starting torque of the motor 11 is increased and its starting current decreased due to the resistance of the windings 27 and the resistances 30, the latter being short-circuited by closing the switch 31 after the motor has accelerated. From the previous discussion it is evident that speed regulation below the inherent motor speed may be obtained by closing the switch 46 to the left for example so that the voltage of the armature 27 opposes the induced voltage of the winding 13 appearing at the brushes 15 when the motor 11 operates below synchronous speed, and then obtaining the desired speed by adjustment of the resistance 44. It is also evident that by closing the switch 46 to the right the current in the field 42 is reversed, thus reversing the voltage of the winding 27 so that it now assists the voltage at the brushes 15 and causes the motor 11 to run above its inherent speed. Speed regulation up to and above synchronism is then obtained by adjustment of the resistance 44. The working magnetic flux of the motor 11 has not been varied during the speed variation, hence satisfying the requirement for a constant torque load. It will be evident that when the motor 11 drives a constant torque load the generator 21 is unnecessary and may be eliminated, thus reducing the cost of the regulating set. Further economy may be made by short-circuiting the ends of the windings 12 inside the frame of the motor 11, thus eliminating the switch 25.

If it is desired to regulate the speed of the motor 11 when driving a constant horse-power load it will be highly desirable to increase the available torque of the motor 11 as the speed is decreased and decrease the available torque as the speed is increased. This variation in available torque is obtained by varying the total voltage applied to the winding 12 thereby varying the working magnetic flux of the motor and. therefore, the motor is operated with the switch 25 closed to the left. The speed of the motor is regulated in the manner described when driving constant torque loads. When the speed is to be decreased below the inherent motor speed with a constant horse power load the working magnetic flux will be increased by closing the switch 45 to the left, for example, so that the voltage of the winding 22 assists the voltage supplied to the winding 12 from the supply lines 10. As the speed is reduced the working flux in the winding 12 is thus increased by suitably adjusting the resistance 43. When the speed is to be increased up to and above synchronism the working magnetic flux will be decreased by closing the switch 45 to the right so that the voltage of the winding 22 opposes the voltage supplied to the winding 12 from the supply 10. As the speed is increased the working magnetic flux in the winding 12 is decreased by suitably adjusting the resistance 43.

If it is desired to regulate the speed of the motor 11 when driving a fan load it will be highly desirable to reduce the available torque of the motor 11 as the speed is decreased and increase the available torque as the speed is increased, and therefore the motor 11 is operated with the switch 25 closed to the left. When the speed is to be decreased below the inherent motor speed the switch 45 is closed to the right and the voltage of the winding 22 opposes the voltage supplied to the winding 12 from the lines 10. As the speed is reduced the working magnetic flux in the winding 12 is reduced by suitably adjusting the resistance 43. When the speed is to be increased up to and above synchronism the switch 45 is closed to the left and the voltage of the winding 22 will assist the voltage supplied to the winding 12 from the lines 10. As the speed is increased the working magnetic flux in the winding 12 is increased by suitably adjusting the resistance 43. When driving any type of load the motor power factor may be varied by any of the means known to those skilled in the art. An example of one of such means is shown in Fig. 1 wherein the power factor of the motor 11 is varied by shifting the phase angle between the voltages of the synchronous machines 16 and 26 by varying the relative excitation of the quadrature fields 35 and 36 of the machine 16.

By making winding 12 and generator 21 of suitable capacity it is possible to operate the motor 11 with the fan loads or constant horse power loads without reversing the voltage of the generator 21 but this results in an uneconomical construction of the generator 21 without obtaining any operating advantages.

Fig. 2 represents a modification of Fig. 1 and similar parts to those shown in Fig. 1 are represented by the same reference numerals. The dissimilar parts are the induction regulators represented by 47, 48, 49 and 50 which consist of the stationary primaries 51, 52, 53 and 54 respectively, and the rotatable secondaries 55, 56, 57 and 58 respectively. The switches 59 and 60 will connect the primaries of the regulators to the lines 10. It is to be understood that the free ends of the rotating secondaries 55, 56, 57 and 58 are connected to collector rings or flexible cables and the secondaries 55 and 56 are rotated simultaneously at equal or unequal angular velocities and the same is true of the secondaries 57 and 58, and any means may be employed to obtain such simultaneous relative rotations. To simplify the drawings I have omitted the illustration of the collector rings or flexible cables and the means to rotate the secondaries as they are all well known to those skilled in the art.

To simplify the description of the operation of the regulators 47 and 48, I will assume that the ratios of their turns are such that the secondaries 55 and 56 have equal voltages when in the same angular position and that they are mechanically held together in this position. The primaries 51 and 52 are connected as shown so that their currents will have opposite phase rotation. By connecting the secondaries 55 and 56 in series as shown and rotating them at equal angular velocities the phase of the resulting voltage at the ends of the secondary 55 will remain constant while its value may be adjusted to any value within the capacity of the regulators, whereas if they were rotated at unequal angular velocities the phase as well as the value would be varied. By rotating the secondaries 55 and 56 in one direction from their neutral positions the resultant voltage will have a certain instantaneous direction whereas rotating them in the opposite direction will cause the resultant voltage to have the opposite instantaneous direction. It is evident that the frequency of the resultant voltage will be the same as the frequency of the lines 10. This description of operation also applies to the regulators 49 and 50.

It is evident that the set of regulators 47 and 48 takes the place of and produces a regulating influence similar to that of the synchronous generator 21 in Fig. 1 and hence the working magnetic flux for the motor 11 can be increased by rotating the secondaries 55 and 56 in one direction from their neutral positions or the flux can be decreased by rotating them in the opposite direction. Likewise, the set of regulators 49 and 50 takes the place of and produces a regulating influence similar to that of the synchronous generator 26 in Fig. 1 and the motor speed can be decreased below its inherent value by rotating the secondaries 57 and 58 in one direction from their neutral positions or the speed can be raised above its inherent value by rotating them in the opposite direction. It is evident that the motor speed can be varied above and below synchronism and that at the same time the motor characteristics can be made suitable for driving either a constant torque load, a constant horse-power load, or a fan load. It is evident that for constant torque loads the motor 11 is operated with the switch 25 closed to the right and for constant horse power and fan loads the switch 25 is closed to the left. In accordance with the operating description given in connection with Fig. 1 it will be evident that the regulators 47 and 48 and the switches 25 and 59 may be dispensed with when the motor drives a constant torque load, thus reducing the cost of the regulating set. The power factor of the motor 11 may be varied by rotating the secondaries 57 and 58 at unequal angular velocities or other well known means may be used to vary the motor power factor.

In Fig. 1, power factor regulation of both the primary and secondary windings of the motor 11 is produced simultaneously by varying the relative excitation of the quadrature fields 35 and 36 in the synchronous motor 16. In Fig. 2 the synchronous motor 16 is unnecessary and the power factor regulation of the primary and secondary windings of the motor 11 are independent of each other. All the power factor regulation desired may be made in the primary winding 12 by the induction regulators 47 and 48, or all the power factor regulation desired may be made in the secondary winding 13 by the induction regulators 49 and 50, or the desired power factor regulation may be made in both windings by the use of both sets of induction regulators.

Fig. 3 represents a preferred modification of my invention in which only one synchronous generator is used to regulate the motor speed above and below synchronism and at the same time cause the motor characteristics to be suitable for driving either a constant torque load, a constant horse power load, or a fan load. In this figure like parts to those shown in Fig. 1 are represented by the same reference numerals. The additional reference numerals indicate the brushes 61 resting on the collector rings 62 which are connected to the taps 63 in the winding 27 of the generator 26', whereas 64 represents the connecting leads between the switches 25 and 65 and the brushes 61, and 66 represents the connecting leads between the switches 31 and 67 and the brushes 29.

A brief description of the operation follows: Assume it is desired to regulate the speed of the motor when driving a constant torque load. The switches 20, 40, and 32 are closed, the switch 67 is closed to the left and the motor 11 can be started as an induction motor by closing the switch 25 to the right since the free ends of the winding 12 are then short-circuited and the other ends are connected to the lines 10 and the brushes 15 are connected to the winding 27. If desired the motor 11 can be started as an alternating current commutator motor by closing the switch 65 to the right or left and closing the switch 25 to the left in which case the free ends of the winding 12 and the brushes 15 are connected to the winding 27 and the other ends of the winding 12 are connected to the lines 10. From the description accompanying Fig. 1, it is clear that when driving a constant torque load the motor should be operated with the switch 25 closed to the right. The working magnetic flux for the motor 11 will remain constant while its speed can be varied above and below synchronism by the generator 26', thus satisfying the requirement for a constant torque load.

If the motor 11 is to drive a constant horsepower load or a fan load it will be operated with the switch 25 closed to the left and therefore it is preferable to start 11 as an alternating current commutator motor with the switch 25 closed to the left and exciting the field winding of generator 26' for the minimum speed condition of 11 and inserting resistance 30 during starting, therefore resulting in minimum starting current and obviating the switching of switch 25 after starting with its attendant current surge. I will first assume that motor 11 is to drive a fan load. When the switch 46 is closed to the left for example, the voltage of the generator 26' will oppose the voltage delivered to the windings 12 by the lines 10 and at the same time the voltage of the generator 26' will act as an opposing voltage impressed on the armature winding 13, thus reducing the flux of the motor 11 and at the same time decreasing its speed below its inherent value. By increasing the voltage of the generator 26' the motor speed can be decreased while at the same time its flux is reduced. By closing the switch 46 to the right, the voltage of the generator 26' will assist the voltage delivered to the windings 12 by the lines 10 and at the same time the voltage of the generator 26' will act as an assisting voltage injected into the armature winding 13, thus increasing the flux of the motor 11 and at the same time increasing its speed above its inherent value. It is evident that the motor flux will increase as its speed is increased and conversely its flux will decrease as its speed is decreased, thus satisfying the requirements for a fan load.

When the motor 11 is to drive a constant horse power load the brushes 15 will be shifted approximately 180 electrical degrees from the position used with fan loads and the motor 11 started. By closing the switch 46 to the left the voltage of the generator 26' will oppose the voltage delivered to the windings 12 by the lines 10 and at the same time the voltage of the generator 26' will act as an assisting voltage impressed on the armature winding 13, thus reducing the flux of the motor 11 and at the same time increasing its speed above its inherent value. By closing the switch 46 to the right the voltage of the generator 26' will assist the voltage delivered to the windings 12 by the lines 10 and at the same time the voltage of the generator 26' will act as an opposing voltage impressed on the armature winding 13, thus increasing the flux of the motor 11 and at the same time decreasing its speed below its inherent value. It is evident that the motor flux will increase as its speed is decreased, and conversely, its flux will decrease as its speed is increased, thus satisfying the requirements for a constant horse power load. The power factor of the motor 11 may be varied by adjusting the relative values of the currents in the quadrature fields 35 and 36.

In Fig. 3 when the motor 11 is driving a constant torque load the voltage of the generator 26' is applied only to the armature winding 13 but when the motor is driving a constant horse power load or a fan load the same voltage is simultaneously applied to the stator winding 12 and the armature winding 13. In some cases the ratios of the turns in the windings 12 and 13 are such that it is desirable to impress different voltages on these windings without the use of resistances or other power consuming means. This may be accomplished by bringing out taps from the generator winding 27, thus obtaining a desired fraction of the full generator voltage. As shown in Fig. 3, these taps represented by 63 are connected to collector rings 62 on which bear brushes 61. It is evident that by the proper closing of the switches 65 and 67 the windings 12 and 13 may have impressed thereon the full voltage from the brushes 29 or less than the full voltage from the brushes 61, or either winding may have impressed thereon the full voltage and the other winding have impressed thereon less than full voltage. In the usual case the motor 11 is permanently connected to a certain type of load, hence all the connections may be made permanent and the switches 65 and 67 can be dispensed with.

Fig. 4 represents a modification of Fig. 3. The regulating means in Fig. 4 consists of one set of induction regulators similar in construction and operation to the induction regulators represented by the same reference numbers in Fig. 2. The remainder of the parts in Fig. 4 are similar to those represented by the same reference numbers in Fig. 3. It is evident that the set of regulators 49 and 50 takes the place of and produces a regulating influence similar to that of the generator 26' in Fig. 3 and hence the embodiment shown in Fig. 4 is capable of producing results substantially similar to those described in connection with Fig. 3. It is evident that for constant torque loads the motor 11 is operated with the switch 25 closed to the right and for constant horse power and fan loads the switch 25 is closed to the left. The power factor of the motor 11 may be varied by rotating the secondaries 57 and 58 at unequal angular velocities.

In the embodiment shown in Fig. 3 it is necessary to shift the brushes 15 from one neutral position to the other when changing the motor operation from constant horse power load to fan load, or vice versa. In many cases the motor construction makes its difficult or objectionable to shift the brushes from one neutral position to the other. It is desirable however to have a regulating set with only one synchronous generator that is capable of producing the results obtainable with the embodiment shown in Fig. 3 without shifting the brushes. Such a regulating set is shown in Fig. 5 in which similar parts to those in Fig. 3 are represented by the same reference numbers. The additional parts shown in Fig. 5 are the switches 68 and 69 and an additional winding 70 in the generator 26''. The windings 27 and 70 are assembled 180 electrical degrees apart and hence their voltages at any instant will be in opposite directions. They may be designed to generate equal or unequal voltages as found desirable for the motor. I have represented the winding 27 connected to the switch 69 and the winding 70 connected to both switches 68 and 69 but these connections are only for illustration and may be in the reverse order.

A brief description of the operation of the embodiment shown in Fig. 5 now follows: From the description accompanying Fig. 3 it is evident that for a constant torque load the motor 11 should be operated with the switches 68 and 69 closed to the right and hence the speed is regulated by the voltage of the winding 27. Now assume for example that the brushes 15 are in their proper position and the motor 11 is to drive a constant horse power load. The switch 68 will be closed to the left, the switch 46 will be closed to the left for example, so that the voltage of winding 70 opposes the voltage delivered to the windings 12 by the lines 10, and the switch 69 will be closed to the right so that the voltage from the winding 27 will act as an assisting voltage in the winding 13 because the voltage of winding 27 is always in the opposite direction to the voltage of the winding 70. The motor will run above its inherent speed and by increasing the current in the field 42 the speed of the motor 11 will rise while its flux will decrease, thus satisfying the requirements for a constant horse power load. If the motor 11 is to drive a fan load the switches 68 and 69 will be closed to the left and hence only the voltage from the winding 70 is used, and if for example this voltage opposes the voltages delivered to the windings 12 by the lines 10, it will also act as an opposing voltage in the windings 13. The motor will run below its inherent speed and by increasing the current in the field 42 the speed and flux of the motor 11 will be caused to decrease, thus satisfying the requirements for a fan load.

A modification of Fig. 5 is shown in Fig. 6 which consists of one set of induction regulators similar to those represented in Fig. 2 by similar reference numbers except that the induction regulator 47' has a secondary 55' composed of the windings 71 and 72 assembled 180 electrical degrees apart and the induction regulator 48' has a secondary 56' composed of the windings 73 and 74 assembled 180 electrical degrees apart. The remaining parts in Fig. 6 are similar to those represented by Fig. 5 by the same reference numbers. The secondary windings 71 and 73 are assembled mechanically in line and connected electrically in series and therefore act as one induction regulator which takes the place of and produces regulating influences similar to one of the windings of the generator 26''. The same is true with the secondary windings 72 and 74 which thus takes the place of and produces regulating influences similar to the other winding of the generator 26''. It is therefore evident that the embodiments shown in Figs. 5 and 6 are capable of producing similar results.

I have described my invention in connection with the non-brush shifting motor because by means of my invention it is possible to simultaneously vary both the speed and operating characteristics to suit the load and hence the motor can have interpole windings to improve its commutation. It is evident however that my invention is also applicable to the brush shifting motor to vary its operating characteristics to suit its load. In addition to the described operating advantages obtainable by means of my invention there also results improved commutation and efficiency due to operation with decreasing flux as the speed is lowered with fan loads. It is evident that several motors may be simultaneously operated from one regulating set of suitable capacity and the effect produced on each motor can be controlled by selecting the proper position for the brushes and choosing a suitable ratio of turns in the primary and secondary windings.

It is evident that in all the modifications shown it is possible to start the alternating current commutator motor with the regulating apparatus adjusted to give a motor speed at, above or below synchronous speed and hence I do not wish to limit my invention to the starting speeds described which are merely illustrative. Likewise I have described my invention in connection with a three-phase alternating current commutator motor and a three-phase regulating set with a synchronous driving motor, but it is evident that my invention is equally applicable to a motor with another number of phases and with any means to drive the synchronous generators at synchronous speed. It is well known to those skilled in the art that though I have described my invention in connection with a regulating set composed of synchronous generators or induction regulators yet other means may be employed to obtain alternating current of the same frequency as that supplied to the motor and hence I do not wish to be limited to the voltage generating means shown. It is likewise evident that modifications of my invention can be arranged otherwise than I have shown without departing from the spirit of my invention. Accordingly I wish it understood that my invention is not to be limited to the exact means shown and that such other modifications as fall within the true spirit and scope of my invention are intended to be included within the scope of the appended claims.

What I claim as new and desire to secure by Letters Patent of the United States, is:

1. In combination, an alternating current commutator type dynamo electric machine comprising a primary winding and a commutated winding provided with commutator brushes, a suitable source of alternating current connected to said primary winding, a synchronous generator electrically connected to said brushes and means to drive said synchronous generator at a speed whereby the frequency of its currents is equal to the frequency of said source.

2. In combination, an alternating current commutator type dynamo electric machine comprising a primary winding and a commutated winding provided with commutator brushes, a suitable source of alternating current connected to said primary winding, a synchronous generator electrically connected to said brushes, a synchronous motor to drive said synchronous generator at a speed whereby the currents of the said generator have the same frequency as the said source, means for varying and reversing the excitation of said synchronous generator, and means to vary the phase angle between the voltages of said two synchronous machines.

3. In combination, an alternating current commutator motor comprising a primary winding and a commutated winding provided with commutator brushes, a suitable source of alternating current having a substantially constant voltage connected to said primary winding thereby producing the working magnetic flux of the said motor, means for producing an alternating current regulating voltage having the frequency of said source and a magnitude which is adjustable independently of the voltage of said source, and means for simultaneously increasing the voltage impressed on said primary winding and impressing increasing magnitudes of said regulating voltage on said commutator brushes and simultaneously decreasing the voltage impressed on said primary winding and impressing decreasing magnitudes of said regulating voltage on said commutator brushes.

4. In combination, an alternating current commutator motor comprising a primary winding and a commutated winding provided with commutator brushes, a suitable source of alternating current having a substantially constant voltage connected to said primary winding thereby producing the working magnetic flux of the said motor, means for producing an alternating current regulating voltage having the frequency of said source and a magnitude which is regulable independently of the voltage of said source, and means for simultaneously increasing the voltage impressed on said primary winding and impressing decreasing magnitudes of said regulating voltage on said commutator brushes and simultaneously decreasing the voltage impressed on said primary winding and impressing increasing magnitudes of said regulating voltage on said commutator brushes.

5. In combination, an alternating current commutator motor comprising a primary winding and a commutated winding provided with commutator brushes, a suitable source of alternating current connected to said primary winding, means to impress on said commutator brushes alternating current regulating voltages having the same frequency as the said source, and means to simultaneously impress on said primary winding alternating current regulating voltages having the same frequency as the said source in conjunction with the voltages impressed by the said source.

6. In combination, an alternating current commutator motor comprising a primary winding and a commutated winding provided with commutator brushes, a suitable source of alternating current connected to said primary winding, means to impress on said commutator brushes alternating current regulating voltages having the same frequency as the said source, means to simultaneously impress on said primary winding alternating current regulating voltages having the same frequency as the said source in conjunction with the voltages impressed by said source, means for varying the magnitudes of said regulating voltages, and means for reversing the direction of said regulating voltages.

7. In combination, an alternating current commutator motor comprising a primary winding with two sets of winding ends brought out and a commutated winding provided with commutator brushes, a suitable source of alternating current connected to one set of said winding ends, means to obtain alternating current regulating voltages having the same frequency as the said source and connecting means whereby the said regulating voltages are simultaneously impressed on the other set of said winding ends and on said commutator brushes.

8. In combination, an alternating current commutator motor comprising a primary winding with two sets of winding ends brought out and a commutated winding provided with commutator brushes, a suitable source of alternating current connected to one set of said winding ends, means to obtain alternating current regulating voltages having the same frequency as the said source, connecting means whereby said regulating voltages are simultaneously impressed on the other set of said winding ends and on said commutator brushes, means for varying the magnitudes of said regulating voltages, and means for reversing the direction of said regulating voltages.

9. In combination, an alternating current commutator type dynamo electric machine comprising a primary winding and a commutated winding provided with commutator brushes, a suitable source of alternating current connected to said primary winding, two synchronous generators provided with armature and field windings, means for connecting the armature winding of one of said generators in series with the primary winding of said machine, means for connecting the armature winding of the other of said generators to said commutator brushes, means for adjustably energizing said field windings, and means for driving said generators at their synchronous speeds whereby the voltages delivered by their armature windings have the frequency of said source.

10. In combination, an alternating current commutator type dynamo electric machine comprising a primary winding and a commutated winding provided with commutator brushes, a suitable source of alternating current connected to said primary winding, a synchronous generator provided with two separate armature windings and a field winding, means for connecting one of said armature windings in series with the primary winding of said machine, means for connecting either of said armature windings to said commutator brushes, means for adjustably energizing said field winding, and means for driving said generator at its synchronous speed whereby the voltages delivered by its armature windings have the frequency of said source.

11. In combination, an alternating current commutator motor comprising a primary winding and a commutated winding provided with commutator brushes, a suitable source of alternating current connected to said primary winding thereby producing the working magnetic flux of the said motor, means to obtain two separate alternating current regulating voltages having the same frequency as the said source, connecting means to impress either of said voltages on the said primary winding in conjunction with the voltages impressed by said source, connecting means to impress the other of said voltages on the said brushes, means to vary the magnitudes of said voltages and means to reverse the directions of said voltages.

12. In combination, an alternating current commutator motor comprising a primary winding and a commutated winding provided with commutator brushes, a suitable source of alternating current connected to said primary winding thereby producing the working magnetic flux of the said motor, a synchronous generator delivering two separate alternating current regulating voltages having the same frequency as the said source, connecting means to impress either of said voltages on the said primary winding in conjunction with the voltages impressed by said source, connecting means to impress the other of said voltages on the said brushes, means to vary the magnitudes of said voltages and means to reverse the directions of said voltages.

13. The method of controlling the speed torque characteristic of an alternating current commutator motor having an exciting winding and a commutated armature winding, the said method including the steps of impressing alternating current voltages having the same frequency on the exciting winding and on the armature winding, increasing the magnitude of each voltage to lower the motor speed during its sub-synchronous speed range, decreasing the magnitude of each voltage to raise the motor speed during its sub-synchronous speed range, reversing the relative instantaneous direction of the voltage impressed on the armature winding to obtain operation of the motor above its synchronous speed, decreasing the magnitude of the voltage impressed on the exciting winding and increasing the magnitude of the voltage impressed on the armature winding to raise the motor speed during its super-synchronous speed range, and increasing the magnitude of the voltage impressed on the exciting winding and decreasing the magnitude of the voltage impressed on the armature winding to lower the motor speed during its super-synchronous speed range.

14. The method of controlling the speed torque characteristic of an alternating current commutator motor having an exciting winding and a commutated armature winding, the said method including the steps of impressing alternating current voltages having the same frequency on the exciting winding and on the armature winding, decreasing the magnitude of the voltage impressed on the exciting winding and increasing the magnitude of the voltage impressed on the armature winding to lower the motor speed during its sub-synchronous speed range, increasing the magnitude of the voltage impressed on the exciting winding and decreasing the magnitude of the voltage impressed on the armature winding to raise the motor speed during its sub-synchronous speed range, reversing the relative instantaneous direction of the voltage impressed on the armature winding to obtain operation of the motor above its synchronous speed, increasing the magnitude of each voltage to raise the motor speed during its super-synchronous speed range, and decreasing the magnitude of each voltage to lower the motor speed during its super-synchronous speed range.

JOHN I. HULL.